United States Patent [19]

Wolff

[11] Patent Number: 5,069,064

[45] Date of Patent: Dec. 3, 1991

[54] MAGNET ATTACHMENT TO SPRING SEAT OF FUEL INJECTION APPARATUS

[76] Inventor: George D. Wolff, P.O. Box 9407, Winter Haven, Fla. 33883

[21] Appl. No.: 551,278

[22] Filed: Jul. 12, 1990

[51] Int. Cl.[5] .......... G01M 15/00

[52] U.S. Cl. .......... 73/119 A

[58] Field of Search .......... 73/119 A, DIG. 3; 239/73; 324/207.2, 207.22, 226, 207.13, 207.15, 207.16, 207.21; 29/595

[56] References Cited

U.S. PATENT DOCUMENTS

| | | | |
|---|---|---|---|
| 3,412,602 | 11/1968 | Rush et al. | 73/119 A |
| 4,366,706 | 1/1983 | Wolff | 73/119 A |
| 4,386,522 | 6/1983 | Wolff | 73/119 A |

*Primary Examiner*—Robert Raevis

*Attorney, Agent, or Firm*—Duckworth, Allen, Dyer & Doppelt

[57] ABSTRACT

A spring seat assembly including a magnet generating a magnetic field in a fuel injection element such as a needle valve in fuel injection apparatus in an internal combustion engine equipped with a needle lift sensor. A magnet is attached to a cap of a nonmagnetic material, preferably stainless steel. The cap has a rim extending in between the injector spring and the spring seat and centering itself on the spring seat with a further cylindrical extension. The cap centers itself in the spring and centers with its cylindrical extension the spring seat as well. Since the cap is held with its rim securely between spring seat and spring due to the spring force and the acceleration forces on the spring seat, cap and magnet cannot separate from the spring seat. A suitable epoxy is used to secure the magnet and the cap and may also be used to hold the entire assembly together while not installed in the injector. Alternatively, the cap and the magnet may be brazed together.

11 Claims, 1 Drawing Sheet

MAGNET ATTACHMENT TO SPRING SEAT OF FUEL INJECTION APPARATUS

BACKGROUND OF THE INVENTION

The present invention relates generally to internal combustion engines, and more particularly relates to sensing the position of a needle vale with a magnetoresponsive sensor to maximize the efficiency of engine operation and reduce unwanted exhaust emissions.

The present invention is an improvement in part over that disclosed in U.S. Pat. No. 4,386,522 issued June 7, 1983, the disclosure of which is hereby incorporated by reference. In said reference patent there is disclosed in FIG. 7 a spring seat referred to with numeral 44, with a spring centering plug 46 having a smaller diameter extension 48 on which a magnet 50 is mounted and secured with a cap 53 which is welded to the extension 48 of the spring seat.

Although the embodiment as disclosed in U.S. Pat. No. 4,386,522 serves a useful purpose, it does have some disadvantages in manufacture and operation. Mounting and welding of the cap 53 to the extension 48 requires a close fit and close attention to the welding process. If the welds are not perfect, the cap may separate from the extension due to the deceleration force at the end of the needle lift. Also, in some applications the deceleration forces can be so high that the attachment disclosed in U.S. Pat. No. 4,386,522 can fail after prolonged operation.

SUMMARY OF THE INVENTION

The present invention discloses an improved spring seat assembly which is easy to fabricate and does not require any welding. A cap with a rim and a cylindrical extension is provided to which the magnet is brazed or attached with a suitable epoxy and which is held securely between the nozzle holder spring and a spring seat with a flat surface. The cap centers the spring and the spring seat and keeps them aligned. The cap and magnet assembly may or may not be attached to the spring seat. Apart from these functions, the cap has also the purpose of protecting the magnet. The cap is preferably a deep-drawn part made from nonmagnetic stainless steel and nonmagnetic electroless nickel plated for protection against wear.

DRAWING

FIG. 1 is a cross sectional view of a spring seat assembly according to the present invention as it may be used in a fuel injector for an internal combustion engine equipped with a magnetorespective sensor as disclosed in FIG. 7 of U.S. Pat. No. 4,386,522;

FIG. 2 is a cross sectional view of a portion of a fuel injector assembly showing a spring seat assembly used in contacting a spring of a fuel injector for an internal combustion engine employing the sensor of the present invention and is disclosed as FIG. 7 in U.S. Pat. No. 4,386,522.

DETAILED DESCRIPTION

Figure 1:
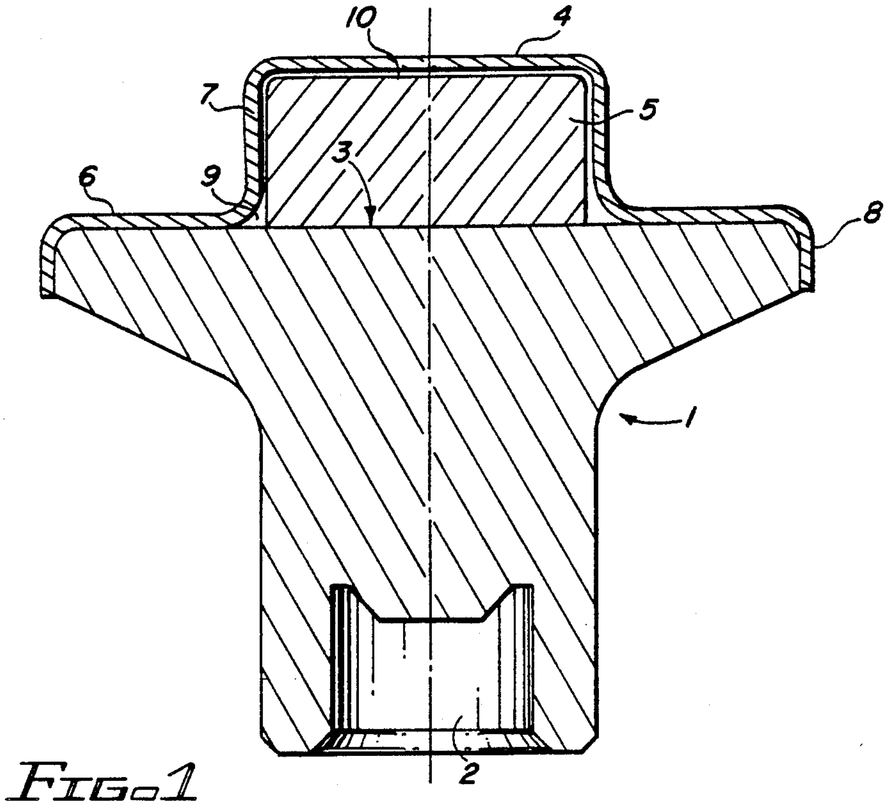
Figure 2:
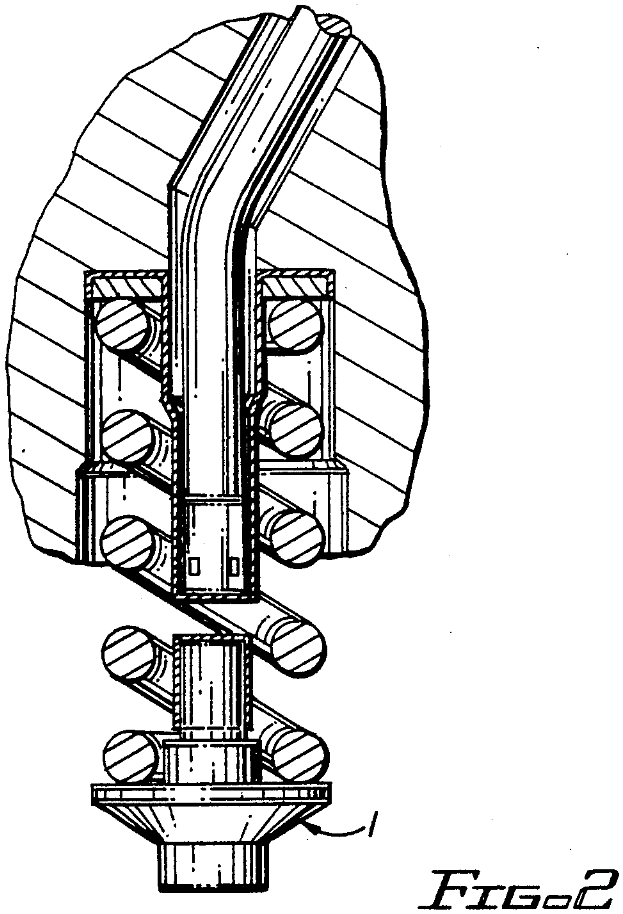

Referring now to FIG. 1, there is illustrated a spring seat assembly having a spring seat 1. Spring seat 1 features a cavity 2 accepting the needle extension (not shown) which transmits the forces between needle and spring seat, as well known in the state of the art. The other end of the spring seat features a flat surface 3 on which a cap 4 and a magnet 5 are mounted. Magnet 5 is preferably a samarium cobalt magnet as such magnets retain best their magnetism when subjected to acceleration/deceleration. The nozzle holder spring (not shown) biases the spring seat towards the needle bearing down on the circular surface of rim 6 of the cap 4. Cap 4 with magnet 5 are thus securely held in place between the spring and spring seat 1. Cap 4 centers itself in the spring inside diameter with its cylindrical part 7 and centers itself on he spring seat with its cylindrical extension 8. Cap 4 is attached with epoxy to magnet 5 filling the clearances 9 and 10 between cap 4 and magnet 5. Alternatively, magnet 5 may be brazed to cap 4 using a preformed brazing ring (not shown) such that the braze will be drawn by capillary action into clearance 9 and 10 as well known in the state of the art. The assembly comprising cap 4 and magnet 5 may or may not be attached to spring seat 1 by the same epoxy and cap 4 may or may not be welded at its rim 6 to spring seat 1 using a suitable welding method such as spot welding. Cap 4 is preferably a deep-drawn nonmagnetic stainless steel part. The cap has to be nonmagnetic, that means transparent to the magnetic field of magnet 5. In order to protect cap 4 against wear, particularly on the surfaces exposed to the nozzle holder spring, the cap is plated with a suitable nonmagnetic plating, such as electroless nickel plating. The material for spring seat 1 is a nickle chromium steel as well known in the state of the art heat treated to about RC 60–63. When epoxy is used, the magnet is preferably magnetized before attachment to cap 4; when brazing is used, the magnet has to be magnetized after brazing because the brazing temperature exceeds the Curie temperature of the magnet.

There has thus been described an improved method to attach a magnet to a spring seat of a fuel injector equipped with a magnetoresponsive sensor to sense the needle lift in a fuel injection system for internal combustion engines. While the invention has been disclosed in a preferred embodiment as a spring seat assembly in a fuel injection system, it will be apparent to those skilled in the art that this magnet attachment may be used in conjunction with other types of valves wherein it is desired to detect opening or closing thereof. Accordingly it is intended that the invention not be limited to the illustrative embodiment, but be given that scope commensurate with the spirit of the appended claims.

We claim:

1. A spring seat assembly for coupling to a spring in a fuel injection apparatus of an internal combustion engine, said spring seat assembly comprising:

- a magnetically transparent cap having a rim which terminates in a cylindrical extension;
- a magnet attached to the magnetically transparent cap;
- attachments means for securing said magnet in said cap; and
- a spring seat attached to the magnet and transmitting forces through the cap to the spring positioned in the fuel injector apparatus.

2. The spring seat assembly of claim 1 wherein said magnetic is a samarium cobalt magnet.

3. The spring seat assembly of claim 1 whereby said cap is a deep-drawn stainless steel cap.

4. The spring seat assembly of claim 3 wherein said cap is plated with a nonmagnetic wear resistant plating.

5. The spring seat assembly of claim 4 wherein said plating is a nonmagnetic electroless nickel plating.

6. The spring seat assembly of claim 1 wherein said spring seat has a flat surface contacting said magnet and cap.

7. The spring seat assembly of claim 1 wherein said cap and said magnet are attached to each other with epoxy.

8. The spring seat assembly of claim 1 whereby said cap and said magnet are attached to each other by brazing.

9. The spring seat assembly of claim 7 or 8 whereby said cap with said magnet is attached to said spring seat by epoxy.

10. The spring seat assembly of claim 7 or 8 whereby said cap and said spring seat are attached to each other by welding.

11. The spring seat assembly of claim 7 or 8 wherein said cap and said spring seat are attached to each other by spot welding.

* * * * *